April 10, 1934.   F. T. POWERS   1,954,098
PAPER COATING MACHINE
Filed May 1, 1931
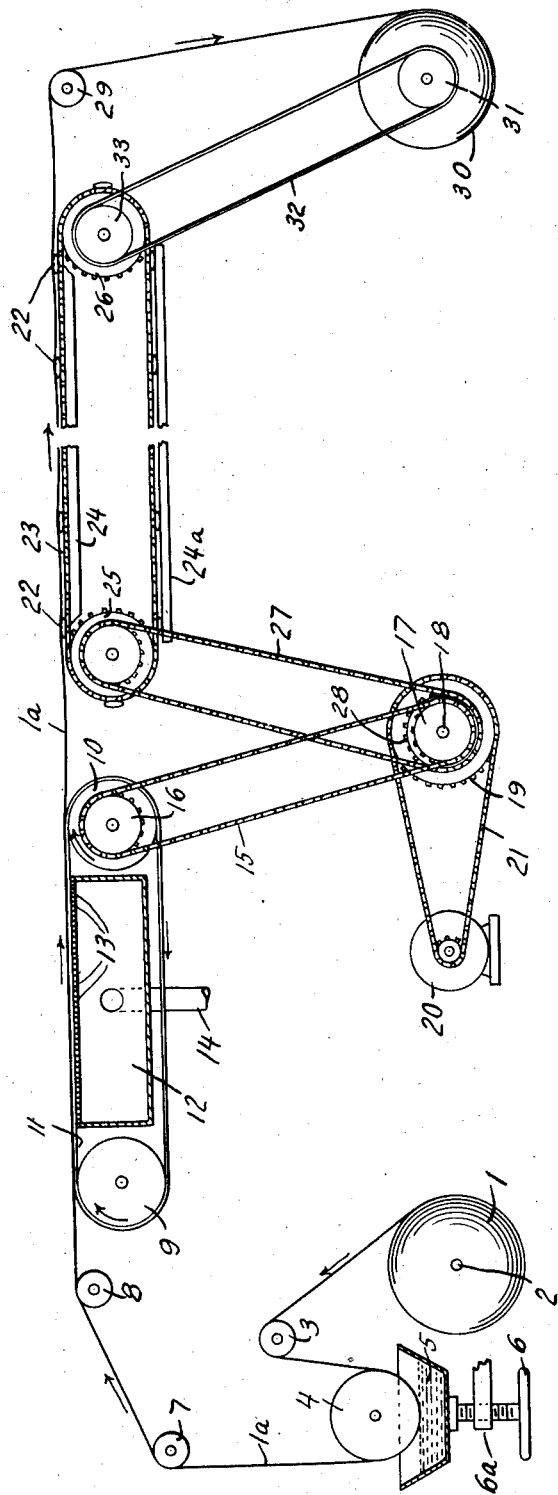
INVENTOR Patented Apr. 10, 1934

1,954,098

UNITED STATES PATENT OFFICE 1,954,098

PAPER COATING MACHINE

Frank T. Powers, Douglaston, N. Y.

Application May 1, 1931, Serial No. 534,344

5 Claims. (Cl. 34—48)

My invention relates to the coating of membranes and particularly to a process and apparatus suitable for carrying out the process, which is adapted to the continuous application of a fluid coating or coatings to the surface of a membrane such as paper or film of various substances.

The purpose of my invention is to provide a process and apparatus whereby membranes may be coated with a drying and/or hardening fluid and the coating dried and/or hardened on the surface of the membrane while the said membrane is borne or carried in a substantially horizontal position while resting upon supporting bars or strips without imparting to the membrane any mark or impression of the supporting bars or strips upon which it rests while drying and/or hardening.

In the application of coatings to long strips of membranes such as paper or the like, it is common practice to first apply the coating in the form of a fluid to one side of the membrane by passing the membrane continuously and at a uniform speed into contact with the fluid to be applied. This contact may be brought about by passing a roller coated with the fluid in contact with the surface of the membrane and so transferring the fluid from the surface of the roller to the surface of the membrane. Or another method commonly employed is to pass the membrane over a suitable roller or rollers positioned close to the surface of a quantity of coating fluid held in a suitable receptacle, in such a manner that the surface of the membrane is continuously brought into contact with the surface of the fluid and so receives its coating. Such coating machines are in common use and as such form no novel part of my invention, which relates particularly to the process and apparatus for handling and supporting the membrane after it has received its coating by such well known means as I have just described, or by other means.

In order to pass the membrane through or over the rollers or other device or devices used in connection with application of the coating to the membrane, it is customary to use what is called a "pull box". This device consists of an endless belt of a porous material such, for example, as felt or cloth, which passes over two drums or large rollers, one or both of which are rotated by suitable power means at a constant and uniform speed, which is usually under the control of the operator.

Between the two drums or large rollers, and also between the upper and lower portions of the endless belt, with its upper surface in contact with the under side of the upper portion of said endless belt is a chamber having a perforated top, but otherwise of air tight construction except for a suitable connection to a vacuum pump or other suitable means for continuously exhausting or drawing air from the interior of said receptacle. As air is drawn from the interior of this receptacle, air is forced to pass through the porous material of the endless belt and through the openings of the perforated top of the receptacle. If a relatively impervious or non-porous membrane, such, for example, as paper, is placed on top of the endless belt of porous material, said non-porous membrane will be drawn or pressed tightly against the porous endless belt, and as the endless belt is moved over the top of the chamber by means of the power driven drums, the non-porous membrane will be drawn along at the same speed as that of the endless belt by reason of the friction between the membrane and the belt. Such a device or "pull box" is not new and, therefore, as a "pull box" or means of pulling a membrane through a coating machine, it forms no part of my invention, but I accomplish another purpose and perform another function with such a "pull box", which I believe to be new and novel, and which will later appear in this description.

After the membrane, which is being coated, has passed the "pull box", it is customary and common practice to support the coated membrane on bars or supports usually extending across and underneath the coated membrane. These bars are usually carried on a track or supported by a chain and are moved along at such a speed that the coated membrane is looped or festooned from one bar to the next in succession, and so supported the membrane is carried along while warm air is blown against its upper surface to dry and/or harden the coating thereon. The length of the track or of the chains carrying the cross bars upon which the coated membrane rests, and the lengths of the loops or festoons of membrane hanging between the cross bars, and the speed at which the bars travel along the track, or the speed of the chains carrying the cross bars, fixes the time which the membrane is exposed for drying. But whatever the duration of the exposure of the coated membrane to the drying process, the membrane is supported on the cross bars in the same position, that is, the same portions of the membrane lie in contact with the cross bars throughout the drying period. And the portions of the membrane which form the loops or festoons remain in the same relative position throughout the drying period. That is, that portion of the membrane which is at the bottom of the loop or festoon at the beginning of its travel along the track remains at the bottom throughout its travel, and the portions which form the inclined or nearly vertical sides of the loops or festoons remain in a substantially similar inclined or nearly vertical position throughout the drying period. In some cases the coated membrane is carried along as level and as free from looping as possible, but there is always some sagging of the membrane between the supports which brings about several undesirable results, among which are the following:

*a.* The portion of the membrane lying continually in contact with the cross bars dries at a different rate than the balance of the membrane, since the balance of the membrane is exposed to the drying action on both sides.

*b.* The fluid coating on the inclined portion of the membrane between the cross bars tends to flow towards the middle of the sagging portion in streaks.

*c.* The tendency of the coating to flow towards the center of the sagging portion produces an uneven coating, one which is thicker at the middle and thinner at the ends of the sagging portion.

*d.* The drying of the coating while the membrane is bent over the cross bars results in ridges or creases in the membrane which are objectionable.

By the use of the new process and my new machine designed to carry out my process, I am able to overcome all of these objectionable features of the present methods and machines. In the accompanying drawing is shown in more or less diagrammatic form the essential elements of one embodiment of my invention which I will now describe.

In this drawing a roll of membrane 1 is carried on a suitable trunnion 2, permitting the membrane to be readily unrolled. The membrane passes from this roll over roller 3, to and partly around a drum 4 mounted in suitable bearings and positioned above a tray 5, in which is placed the fluid coating to be applied to the membrane. The position of the drum 4 and the surface of the fluid coating in the tray 5 is such that the membrane 1a is brought into contact with the surface of the fluid coating material. The relative position of the drum 4 and the fluid tray 5 is controlled by means of adjusting screw 6 by cooperating with a stationary portion 6a of the frame of the machine not shown in the drawing, by means of which screw the tray 5 may be raised or lowered.

From the drum 4 the membrane passes over the guide rollers, 7 and 8, and to the top surface of a pull box of the type referred to above, which consists of large rollers 9 and 10, an endless belt of porous material 11 and chamber 12, having a perforated top 13, and pipe connection 14 leading to a vacuum pump or other air exhausting device not shown in the drawing.

The drums 9 and 10, one or both of them, are provided with power means for rotation in the direction of the arrows at a speed which is under accurate control by the operator, said power means being shown in the drawing as a chain 15 cooperating with sprocket wheel 16 and 17, the latter being attached to a jack-shaft 18, on which is also mounted a sprocket wheel 19 driven by the motor 20 by means of the chain 21.

After passing the "pull box" the membrane 1a is picked up and carried along on a series of cross bars 22, each end attached at regular intervals to endless chain belts 23, only one of which is shown in the drawing, but it is understood that there are two such chain belts spaced apart a distance equal to the length of the cross bars 22. Each of these chain belts is supported by and rides along on the upper surface of two supporting tracks, 24 and 24a, one of which supports the upper strand of the chain belt, and the other of which supports the lower strand. At each end of the track 24 are pairs of sprocket wheels 25 and 26 engaging the two chain belts. One of these pairs of sprockets 25 is provided with power means for driving them at a speed bearing a definite relation to the speed of the porous belt 11 of the pull box. In the drawing I have shown a chain belt 27 and sprocket 28, slightly larger than sprocket 17 which drives the pull box drum 10, as the means whereby the definite relation between the speeds of the chain belt 23 and the belt 11 is maintained, but obviously other well known devices may be utilized for this purpose.

As these machines are usually of great length, often from two hundred to five hundred feet long, I have shown the middle portion cut away in the drawing.

At the discharge end of the carrier mechanism just described the membrane passes over guide roller 29 to a rolling-up device consisting of a roller 30 rotated by power means shown in the drawing as pulley 31, driven by means of belt 32 from pulley 33, upon which roller the finished membrane is rolled at the conclusion of the process.

It will be noted that my machine consists of an assemblage of four mechanisms, namely a coating machine, a "pull box", a travelling carrier, and a rolling-up device. None of these parts are, in themselves, new nor do I claim any invention in respect to any of them separately, but by their use in the manner and to perform the new functions for which I utilize them, I produce a new and far better result than has heretofore been attained by their use individually or collectively. These new results are attained by the following means.

The speed of the belt 11 over the perforated top of the pull box is so regulated as to insure the proper application of the fluid coating to the membrane as it passes over the drum 4 and comes in contact with the fluid in the tray 5. This fixes the speed of the membrane through the entire machine from the time the uncoated membrane leaves the roll 1 until the coated membrane is rolled up on the roller 30.

The speed of the chains 23 and consequently the speed of the cross bars 22 is so regulated as to be slightly greater than the speed of the belt 11, which controls the speed of the membrane. The result is that the cross bars 22 are constantly travelling at a speed slightly in excess of the speed of the membrane resting thereon and consequently these cross bars are gradually creeping ahead under the membrane.

The difference between the speed of the belt 11 and that of the cross bars 22 is, as has already been stated, slight—and by that it is meant that the difference is only enough to cause the cross bars to advance under the membrane very slowly and so come into contact with new portions of the membrane. This constant relative movement overcomes the formation of the objectionable ridges in the membrane mentioned above, which are inherent in the present commonly used method and apparatus for coating membrane wherein the membrane lies in one position on the cross bars continuously throughout the drying and/or hardening period.

This same relative movement of membrane and cross bars also permits the membrane to dry uniformly and so overcome another objectionable feature of present methods and apparatus.

As the cross bars gradually advance under the membrane, those portions of the membrane which were at the lowest part of the loop midway between the cross bars gradually become the highest portions or the portions directly over the cross bars, and in this manner the fluid coating is redistributed more evenly on the surface of the membrane and so there are overcome the remaining objections enumerated above, of the present commonly used methods and apparatus; namely, the running and streaking of the coating and the accumulation of fluid coating material at the bottoms of the loops.

I have stated above that in my new process and apparatus I utilize the "pull box" to accomplish a new purpose and to perform a new operation not hitherto secured or performed by apparatus of this type used as a component part of a membrane coating machine.

It is obvious since the cross bars 22 supporting the membrane 1a travel at a more rapid rate than the membrane, that they will tend to carry the membrane along with them, and that if the membrane were free to move without resistance it would travel along on the top of the cross bars at the same rate as the cross bars and there would be no creeping forward of the cross bars and all of the advantages gained thereby would be lost. I, therefore, utilize the "pull box" for the double purpose of pulling the membrane through the coating machine and to retard the travel of the membrane over the drying section of the machine. Heretofore "pull boxes" of this type have been used in coating machines only to pull the membrane through the coating mechanism, but in my new machine it performs this function and in addition thereto it retards and definitely fixes the speed of the membrane so that the cross bars which in my machine travel slightly faster than the belt 11 of the pull box, must gradually creep forward under the membrane as described above.

It is obvious that if the total pull on the membrane caused by the friction between the membrane and the numerous moving cross bars in contact therewith is equal to the tension required to pull the membrane over the coating rollers, then the pull box does not have to exert any pull on the membrane. If the friction between the membrane and the moving cross bars on which it lies is not sufficient to pull the membrane over the coating rollers, then the additional pull required is imparted to the membrane by the pull box. If, however, the friction between the membrane and the cross bars produces a pull which is greater than that required to pull the membrane over the coating rollers, then the belt of the pull box acts as a brake or retarder and regulates definitely the speed of the membrane. This use of the pull box as a brake or retarder on the speed of the membrane and so making it possible to run the cross bars at a speed slightly greater than that of the membrane is an important feature of my invention.

The speed of the membrane varies with different coatings. Some coatings may be applied best with the membrane travelling at relatively slow speed while other coatings can be applied at considerably higher speeds. For this reason I find it advantageous to so connect the driving mechanisms of the pull box and the device carrying the cross bars that the relative speeds will be constant. For example, I may drive the pull box shaft with a sprocket 17, having fifty-one teeth and drive the shaft of the cross bar carrier with a sprocket 28, having fifty teeth, and so insure that the cross bar carrier will always move one fiftieth or two per cent. faster than the pull box belt.

From the above description, one familiar with the art of applying coatings to membranes will understand my new process and be able to construct apparatus with which to carry it out. I wish it to be understood that numerous variations can be made in the apparatus shown and still successfully carry out the spirit of my invention and I therefore do not limit myself to this particular apparatus as being the sole embodiment of my invention. I have shown a preferred form of apparatus which in the practice of my invention has proved successful

I claim:

1. In an apparatus for drying a coated membrane, the combination of means for controlling the speed of travel of the membrane, and conveying means comprising a pair of endless chains in spaced parallel relation, having attached spaced cross members adapted to receive and support the membrane, and means for causing the said cross members to travel at a speed slightly in excess of the speed of the membrane thereby continuously varying the position of the contact between the membrane and the supporting members while the membrane is being supported thereon.

2. In an apparatus for drying a coated membrane the combination of means for controlling the speed of travel of the membrane and means comprising a travelling conveyor for conveying the coated membrane while resting on spaced transverse supporting members, said conveying means being driven at a constant speed of travel slightly in excess of the speed of travel of the membrane whereby the position of contact between the membrane and the supporting members is constantly moved longitudinally along the membrane.

3. An apparatus for drying a coated membrane, comprising in combination, means for controlling the speed of travel of the membrane and a conveyor comprising two parallel endless chains spaced apart, having spaced cross members attached thereto adapted to receive and support the membrane, and means for driving the conveyor at a constant speed in excess of the speed of travel of the membrane.

4. In an apparatus for drying a coated membrane, the combination of means for controlling the speed of travel of the membrane and conveying means comprising a pair of endless chains in spaced parallel relation, having attached spaced cross members adapted to receive and support the membrane and means for causing the said cross members to travel at a speed slightly in excess of the speed of the membrane, thereby continuously varying the position of the contact between the membrane and the supporting members while the membrane is being supported thereon.

5. In an apparatus for drying a coated membrane, the combination of means for controlling the speed of travel of the membrane, and conveying means comprising a pair of endless chains in spaced parallel relation, having rigidly attached spaced cross bars adapted to receive and support the membrane, and means for causing the said cross bars to travel at a speed slightly in excess of the speed of the membrane whereby the said cross bars are caused to continuously slip along the surface of the membrane to new positions of contact therewith.

FRANK T. POWERS.